United States Patent [19]

Matsuoka

[11] Patent Number: 4,469,351
[45] Date of Patent: Sep. 4, 1984

[54] SEATBELT SYSTEM

[75] Inventor: Fumio Matsuoka, Susono, Japan

[73] Assignee: Toyota Jidosha Kogyo Kabushiki Kaisha, Aichi, Japan

[21] Appl. No.: 343,474

[22] Filed: Jan. 28, 1982

[30] Foreign Application Priority Data

Feb. 12, 1981 [JP] Japan .............................. 56-18534[U]
Feb. 12, 1981 [JP] Japan .............................. 56-18535[U]
Feb. 12, 1981 [JP] Japan .............................. 56-18536[U]

[51] Int. Cl.³ .............................................. B60R 21/00
[52] U.S. Cl. ................................... 280/806; 280/808; 297/479; 297/483
[58] Field of Search ............... 280/803, 804, 806, 808; 297/479, 483

[56] References Cited

U.S. PATENT DOCUMENTS 4,284,295 8/1981 Takeda et al. ...................... 280/808
4,291,918 9/1981 Finn et al. ......................... 280/808

Primary Examiner—Richard A. Bertsch
Attorney, Agent, or Firm—Parkhurst & Oliff

[57] ABSTRACT

A seatbelt system having a webbing to be fastened about an occupant seated at a seat in an automotive vehicle, comprising:

a retractor securing one end of the webbing for winding or unwinding the webbing during normal condition of a vehicle and preventing the webbing from being unwound in the event of an emergency situation of the vehicle;

an anchor plate secured to the other end of the webbing;

driving means such as a door and a motor connected to the anchor plate for moving the anchor plate so that, when the occupant is seated at the seat for operating the vehicle, the webbing is fastened about the occupant seated at the seat and, when the occupant leaves the vehicle, the webbing is released from the occupant; and emergency tensioning device for pulling the anchor plate in the event of an emergency situation of the vehicle in such a direction that the webbing is fastened more tightly about the occupant seated at the seat, the emergency tensioning device being engageable with the anchor plate only when the webbing is fastened about the occupant seated at the seat.

17 Claims, 23 Drawing Figures

SEATBELT SYSTEM

BACKGROUND OF THE INVENTION

This invention relates to seatbelt systems for restraining and protecting an occupant in the event of an emergency situation of an automotive vehicle, and particularly to a seatbelt system for automatically fastening a restraining webbing about the occupant upon his entering the vehicle.

There have been proposed seatbelt systems in which an end portion of the occupant restraining webbing is moved by driving means to automatically fasten the webbing about the occupant upon his entering the vehicle.

In the seatbelt system of the type described, the end portion of the webbing is moved by a driving force of a motor, or the end portion of the webbing is secured to a door and the end portion is moved in accordance with the closing action of the door, so that the webbing can be automatically fastened about the occupant. Consequently, the webbing is fastened about the occupant without fail during running condition of the vechicle, thereby enabling the webbing to fully secure the safety of the occupant.

However, in this automatic fastening seatbelt system, the webbing can be moved from the webbing fastened state to the webbing released state, whereby the winding length of a retractor for winding the end portion of the webbing tends to increase. This leads to the disadvantage that, when a tensile force high in value acts on the webbing in the event of an emergency situation of the vehicle, the webbing, which has been loosely wound into a takeup shaft, is tightly wound and a length of the webbing corresponding to the portion being tightly wound is extended from the takeup shaft.

SUMMARY OF THE INVENTION

Accordingly, the present invention has, as its object, the provision of a seatbelt system, wherein a webbing is automatically fastened about an occupant upon his entering a vehicle, and the occupant can be reliably and tightly restrained by the webbing in the event of an emergency situation of the vehicle.

According to the present invention, in the seatbelt system, one end portion of the webbing is windably or unwindably supported by a retractor and made unwindable in the event of an emergency situation of the vehicle, an anchor plate is solidly secured to the other end of the webbing, the anchor plate is connected to driving means, this driving means, when an occupant is seated to drive the vehicle, moves the anchor plate so that the occupant can be restrained to the seat, and, when the occupant leaves the vehicle, moves the anchor plate so that the webbing can be removed from the occupant. The seatbelt system is provided with emergency tensioning means which, in the event of an emergency situation of the vehicle, pulls the anchor plate to tighten the webbing, so that the occupant can be reliably and tightly restrained. Further, the emergency tensioning means, only when the webbing is restraining the occupant, engages the anchor plate, thereby enabling secure automatic webbing fastening and unfastening performances of the seatbelt system.

DETAILED DESCRIPTION OF THE PREFERRED EMBODIMENTS

Figure 1:
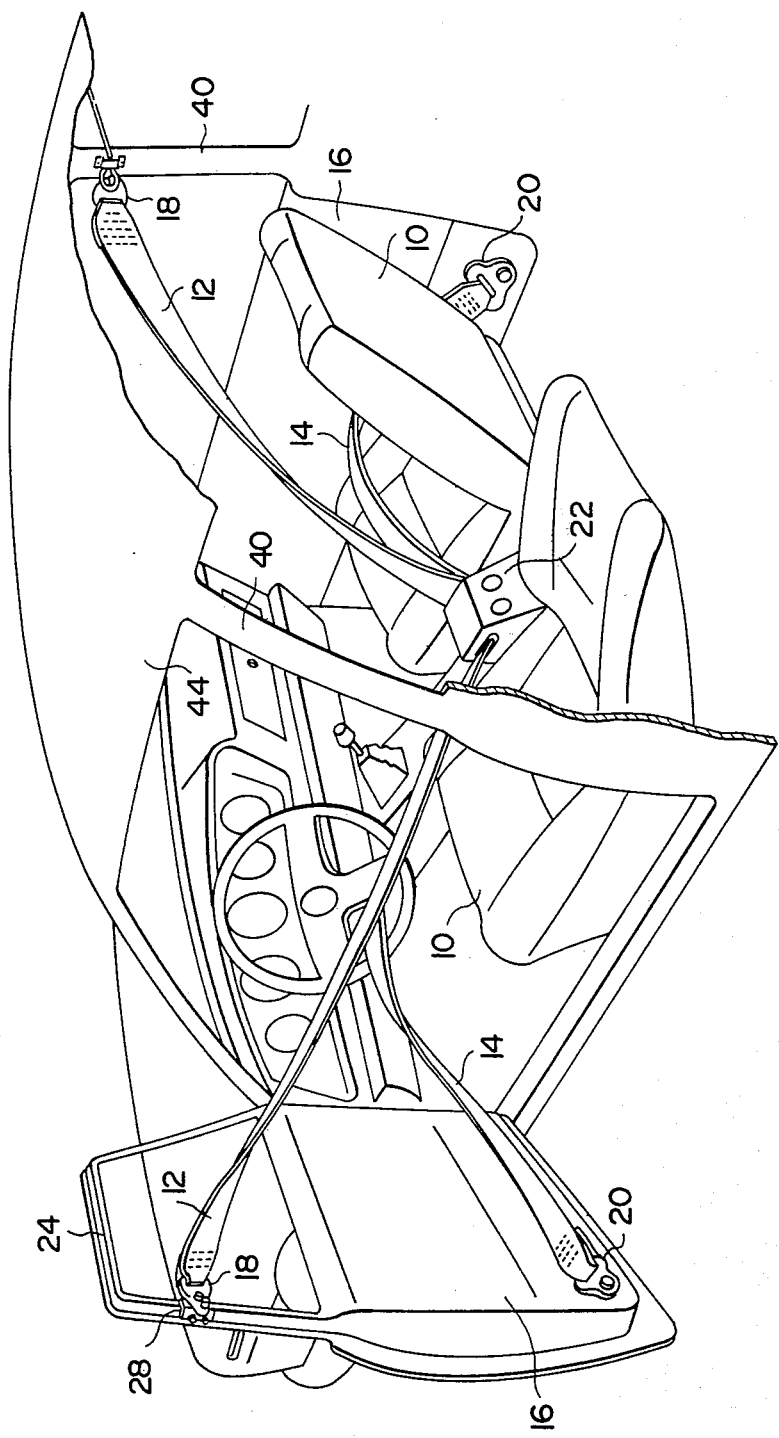
FIG. 1 is a perspective view showing a first embodiment of the seatbelt according to the present invention.

In a first embodiment of the present invention as shown in FIG. 1, an occupant seated at a seat 10 can be brought into a three-point seatbelt restrained state by use of a shoulder webbing 12 and a lap webbing 14.

An outer end portion of the shoulder webbing 12 is secured through an anchor plate 18 to the upper rear end portion of a door 16, and an outer end portion of the lap webbing 14 is secured to the lower rear end portion of the door 16 through an anchor plate 20. Additionally, an inner end portion of the lap webbing 14 is sewn onto the intermediate portion of the shoulder webbing 12, and an inner end portion of the shoulder webbing 12 is wound into a retractor 22 provided substantially at the center of the vehicle. This retractor 22 winds the shoulder webbing 12 by its urging force to constantly give a predetermined value of tension to the shoulder webbing 12, and incorporates therein an inertia lock mechanism for stopping the unwinding of the shoulder webbing 12 through an action of an acceleration sensor in the event of an emergency situation of the vehicle.

As a consequence, in this embodiment, the door 16 functions as webbing driving means, and, when the door 16 is opened as indicated by a driver's seat in FIG. 1, the door 16 moves the webbings 12 and 14 forwardly in the vehicle in accordance with the circularly arcuate opening motion of the door 16 so as to form a space for allowing an occupant to enter the vehicle between the webbings 12, 14 and the seat 10. Furthermore, if the occupant closes the door 16 upon being seated at the seat 10, the door 16 moves the outer end portions of the webbings 12 and 14 rearwardly in the vehicle in accordance with the circularly arcuate motion of the door 16 as indicated by an assistant driver's seat in FIG. 1, so that the intermediate portions of the webbings 12 and 14 can be automatically fastened about the seated occupant.

Figure 2:
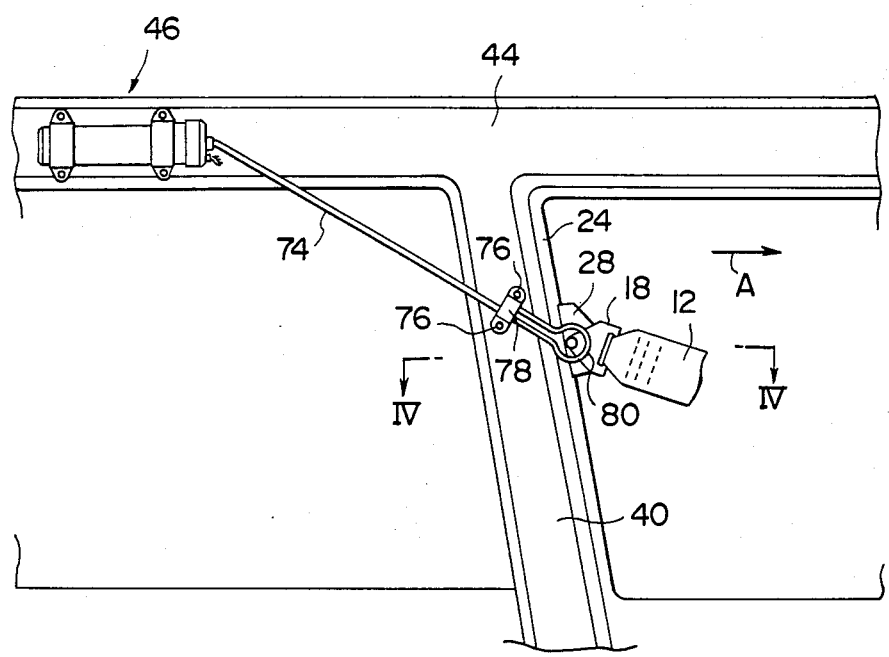
FIG. 2 is a side view from the inboard side of the door showing the side portion of the driver's seat when the door is closed.
Figure 3:
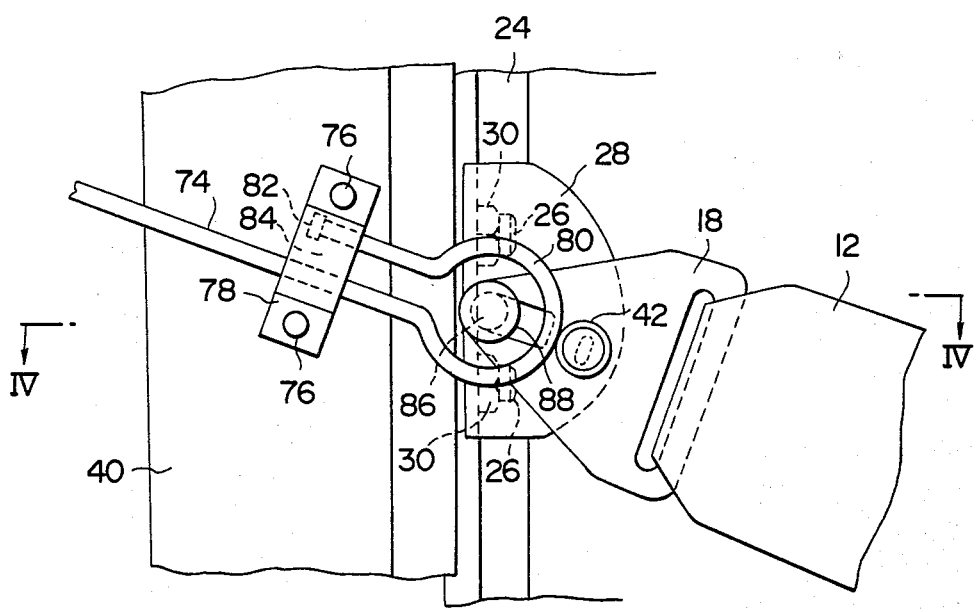
FIG. 3 is a partially enlarged view of FIG. 2.
Figure 4:
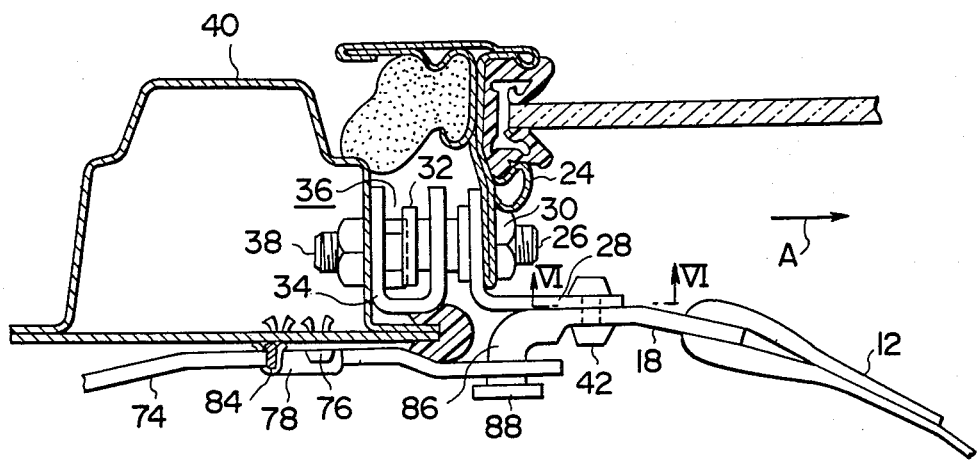
FIG. 4 is a sectional view taken along the line IV—IV in FIG. 3.

Description will hereunder be given of the state of connection between the anchor plate 18 secured to the outer end portion of the shoulder webbing 12 and the door 16 with reference to FIGS. 2 through 4. As shown in FIGS. 3 and 4, an L-shaped anchor plate 28 is solidly secured to a window frame 24 of the door 16 through a pair of anchor bolts 26. These bolts 26 are secured to the window frame 24 such that the bolts 26 penetrate the L-shaped anchor plate 28 and the window frame 24, and threadably coupled from the rearward (in looking from the vehicle) into nuts 30 welded to the forward side (in looking from the vehicle) of the window frame 24 (in a direction indicated by an arrow A). Consequently, the axes of the pair of bolts 26 are arranged in the horizontal direction and in the longitudinal direction of the vehicle.

Figure 5:
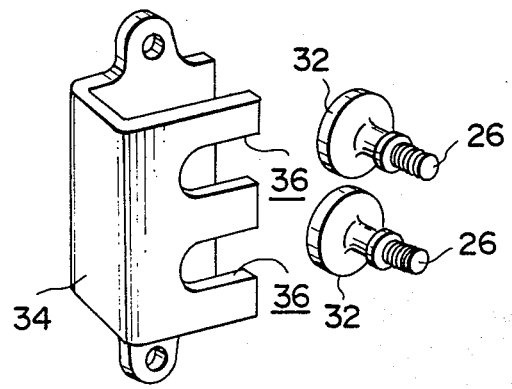
FIG. 5 is a disassembled perspective view showing the relationship between the mounting bolt of the anchor plate and the holder.

As shown in FIG. 5, enlarged head portions 32 of the bolts 26 are opposed to a holder 34. This holder 34 is substantially U-shaped in plan view, and provided at one side edge thereof with a pair of U-shaped grooves 36, into which the bolts 26 are inserted when the door is closed. Further, the enlarged head portions 32 are received in this holder 34.

This holder 34 is secured to the front surface (in looking from the vehicle) of a center pillar 40 of the vehicle through a bolt 38. As a consequence, the enlarged head portions 34, while moving forward in the vehicle during closing of the door, engage the holder 34 and limit the deformation of the window frame 24 to less than a predetermined value.

An anchor plate 18 is affixed through a shear pin 42 to one side thereof extending forwardly in the vehicle from the aforesaid L-shaped anchor plate 28, whereby the outer end portion of the shoulder webbing 12 is secured to the window frame 24 through the anchor plate 18 and the L-shaped anchor plate 28. The axis of the shear pin 42 is directed laterally of the vehicle, and the shear pin 42 is adapted to be shorn when a load of a high value in the longitudinal direction of the vehicle acts between the anchor plate 18 and the L-shaped anchor plate 28, so that the anchor plate 18 can move relative to the L-shaped anchor plate 28.

Consequently, during normal condition of the vehicle, this shear pin 42 imparts the opening or closing force for the door 16 to the shoulder webbing 12, and, only in the event of an emergency situation of the vehicle, functions as temporarily fastening means for enabling the anchor plate 18 to move relative to the door 16.

Figure 6:
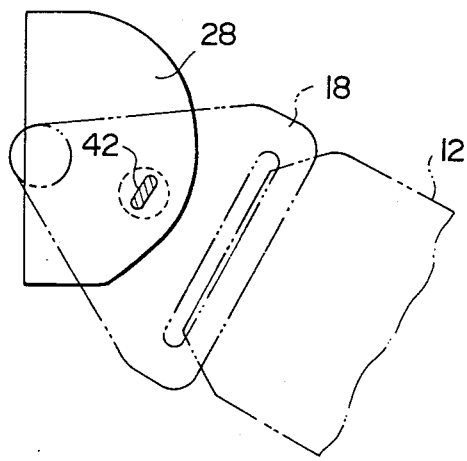
FIG. 6 is a sectional view taken along the line VI—VI in FIG. 4.

As shown in FIG. 6, this shear pin 42 is of a noncircular shape in cross section, and is engaged with noncircular insert holes formed in the L-shaped anchor plate 28 and the anchor plate 18. As a consequence, the anchor plate 18 is non-rotatable about this shear pin 42 during normal operation of the vehicle.

Additionally, when the preset shearing load of this shear pin is low, and the tension on the webbing 12 is of a high value this tension does not act on the window frame 24, so that necessity for the combination of the holder 34 with the bolt 26 as shown in FIG. 5 can be eliminated.

As shown in FIG. 2, an emergency tensioning device 46 is provided inside a roof side member 44 of the vehicle, so as to be able to apply a tension to the shoulder webbing 12 in the event of an emergency situation of the vehicle.

Figure 7:
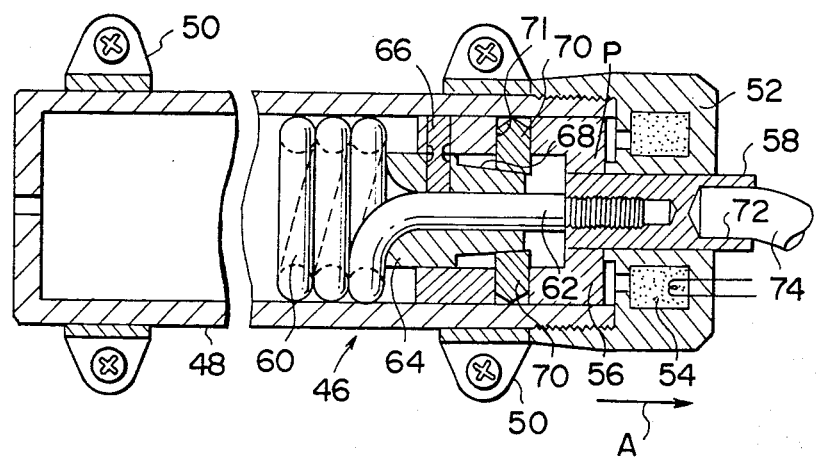
FIG. 7 is a sectional view showing the emergency tensioning device.

As shown in FIG. 7, the emergency tensioning device 46 is constructed such that a cylinder 48, open in a forward direction when looking from the vehicle, is affixed to the roof side member 44 through a pair of brackets with the axis of the cylinder 48 being directed in the longitudinal direction of the vehicle. A cylinder head 52 threadably coupled to the forward end portion (in looking from the vehicle) of this cylinder 48 incorporates therein powder 54 which is connected to an acceleration sensor, not shown, so as to explode in the event of an emergency situation of the vehicle, whereby this explosive force is caused to act on a piston P comprising a piston body 56 and 64 in the cylinder 48, so that the piston body 56 can be moved rearwardly in looking from the vehicle.

A sliding rod 58 is loosely coupled into an axial portion of this piston body 56 in a manner to be rotatable relative to the piston body 56. Further, threadably coupled into an axial portion of this sliding rod 58 is an extended end portion 62 of a coil spring 60 received as the stopper in the cylinder 48 and movable along with the shaft 58.

The hollow member 64 is coupled onto the extended end portion 62 of this coil spring 60, with a shear pin 66 being inserted through the hollow member 64 and the piston body 56. When a relative load exceeding a predetermined value and directed in the longitudinal of the vehicle acts between the hollow member 64 and the piston body 56, this shear pin 66 is shorn, whereby the hollow member 64 becomes movable in a forward direction relative to the piston body 56 when looking from the vehicle, so that an inclined surface of a tapered portion formed on the outer periphery of the hollow member 68 can project a locking pin 70 in the radial direction of the piston body 56 through a radial through hole 71. As a consequence, the forward end portion of this pin 70 bites into the inner peripheral surface of the cylinder 48 so as to stop the movement of the piston 56.

The other end portion of the shaft 58 secured to the piston body 56 is penetratingly provided therein with a round hole 72 which penetrates through the cylinder head 52 and projects forwardly in the vehicle. Inserted into this round hole 72 is one end of a connecting wire 74 formed of a flexible wire. A radial pressure is applied to connecting wire 74 in order to be staked to the shaft 58.

As shown in FIG. 2, the intermediate portion of this connecting wire 74 is directed downwardly, forwardly in the vehicle, and penetrates through a bracket 78 secured to the center pillar 40 by means of shear pins 76. Further, as shown in FIG. 3, the intermediate portion of this connecting wire 74 is turned about, drawing a loop portion 80, inserted into the bracket 78, and an enlarged end portion 82 of the connecting wire 74 is solidly secured to the bracket 78 by means of a filler 84 in the bracket 78. When the connecting wire 74 receives a load of a predetermined value from the emergency tensioning device 46, the shear pins 76 are shorn, so that this bracket 78 can move relative to the center pillar 40.

On the other hand, the axis of the loop portion 80 of this connecting wire 74 is directed laterally of the vehicle, whereby, when the door is closed, a horizontal pin projecting from a portion of the anchor plate 18 is inserted through the loop portion 80.

The horizontal pin 86 of the anchor plate 18 and the loop portion 80 function as connecting means constructed such that, when the anchor plate 18 moves in the directions of fastening and releasing the webbing in accordance with the opening and closing motions of the door 16, the horizontal pin 86 is inserted through and drawn from the loop portion 80 and the horizontal pin 86 and the loop portion 80 are freely movable relative to each other without being engaged with each other, however, when the loop portion 80 and the anchor plate 18 move relative to each other in the longitudinal direction of the vehicle during closing of the door, both the loop portion 80 and the anchor plate 18 are engaged with each other, so that the load can be transmitted therebetween. To ensure this connection, an enlarged head portion 88 is formed at the forward end of the horizontal pin 86.

Description will hereunder be given of action of this embodiment.

As indicated by the driver's seat in FIG. 1, when the occupant opens the door 16, the shoulder webbing 12 and the lap webbing 14 move forwardly in the vehicle in accordance with the circularly arcuate motion of the door to thereby form a space for allowing the occupant to enter the vehicle between the webbings 12, 14 and the seat 10.

When the occupant closes the door 16 upon being seated at the seat, the outer end portions of the webbings 12 and 14 are moved rearwardly in the vehicle in accordance with the circularly arcuate closing motion of the door 16 as indicated by the assistant driver's seat in FIG. 1, whereby the intermediate portions of the webbings are tightly fastened about the occupant, so that the occupant can be automatically brought into the three-point seatbelt fastened state. In this case, the retractor 22 winds the inner end portion of the shoulder webbing 12 by a required length to thereby constantly give a tension of an appropriate value to the shoulder webbing 12.

In this webbing fastened state of the occupant, the horizontal pin 86 of the anchor plate 18 is inserted through the loop portion 80 of the connecting wire 74 extending from the emergency tensioning device 46 as shown in FIGS. 3 and 4.

When the vehicle falls into the event of an emergency situation such as a collision, the acceleration sensor, not shown, ignites the powder 54 of the emergency tensioning device 46. As a consequence, the powder transmits its explosive force to the piston 56 to drive it rearwardly in the vehicle. This driving force is imparted to the connecting wire 74, whereby the bracket 78 shown in FIG. 3 shears the shear pins 76 and the loop portion 80 moves rearwardly in the vehicle to be engaged with the horizontal pin 86, so that the driving force can be imparted to the anchor plate 18.

With the abovedescribed arrangement, the anchor plate 18 shears the shear pin 42 and moves along with the horizontal pin 86 rearwardly in the vehicle.

As a result, the outer end portion of the shoulder webbing 12 moves rearwardly in the vehicle, whereby a tightening tension acts on the shoulder webbing 12, so that the shoulder webbing can be firmly fastened about the occupant.

Simultaneously with the aforesaid action of the emergency tensioning device 46, the retractor 22 provided substantially at the center of the vehicle stops the unwinding of the shoulder webbing 12 through the action of an inertia lock mechanism, so that the occupant can be positively and tightly restrained by the shoulder webbing 12 and the lap webbing 14, thereby enabling to secure the safety of the occupant.

In the emergency tensioning device 46 shown in FIG. 7, if the explosive force of the powder 54 exceeds a required value, then the piston body 56 and the hollow member 64 shear the shear pin 66 and move relative to each other, whereby the inclined surface 68 of the hollow member 64 causes the pin 70 to move in the radial direction, so that the forward end portion of the pin 70 is engaged with the inner peripheral surface of the cylinder 48 to stop the movement of the piston body 56, thereby preventing a tightening force beyond that necessary to act on the occupant. When a tension of a high value takes place in the webbings due to an inertial force of collision generated in the occupant upon termination of the movement of the piston body 56, this tension acts on the coil spring 60, whereby the coil spring 60 is deformed and passes through the hollow member 64, so that the inertial force generated on the occupant can be properly absorbed.

Figure 8:
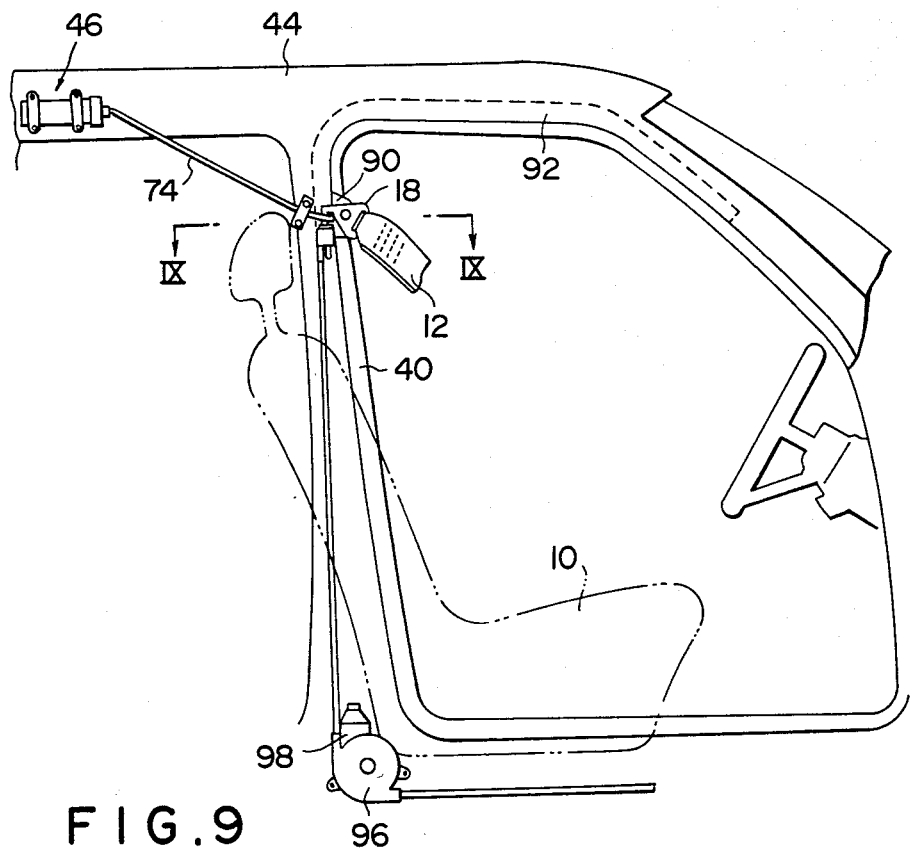
FIG. 8 is a side view showing a second embodiment of the present invention, corresponding to FIG. 2.
Figure 9:
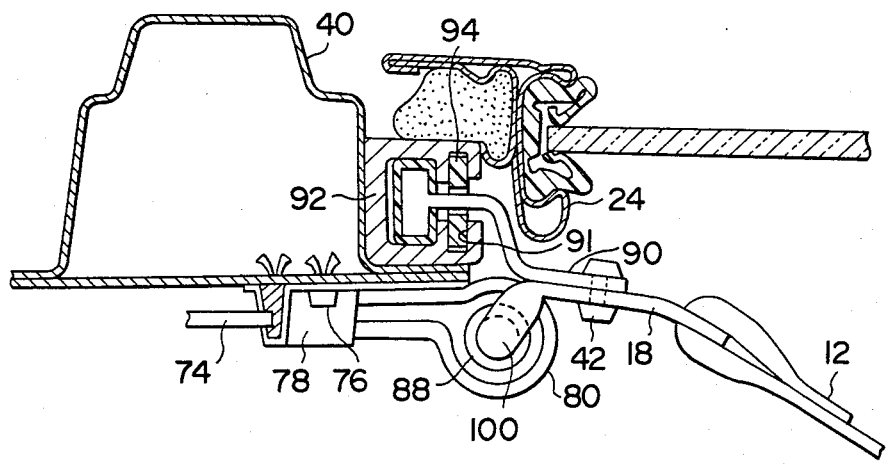
FIG. 9 is a sectional view taken along the line IX—IX in FIG. 8.

Next, FIGS. 8 and 9 show a second embodiment of the present invention. This embodiment is applied to a seatbelt system in which the end portions of the webbings are moved by a driving force of a specially provided motor or the like, but not by the opening and closing force of the door to automatically fasten the webbings about the occupant.

More specifically, a movable anchor 90, to which the anchor plate 18 is temporarily fastened through a shear pin 42, is movable along a guide rail 92 having a slide groove 91, the longitudinally intermediate portion of this guide rail 92 extends along the roof side member 44, and the rear end portion of this guide rail 92 is flexed at a right angle and suspended along the center pillar 40. Additionally, this movable anchor 90 is connected to a flexible transmission member 94 movable in the slide groove 91 as shown in FIG. 9, and the other end of this transmission member 94 is engaged with a sprocket wheel in a sprocket wheel case 96 secured to the lower portion of the center pillar 40. This sprocket wheel is rotated by a driving force of a motor 98, whereby the transmission member 94 transmits the driving force to the movable anchor 90, so that the anchor plate 18 moves along the guide rail 92 in the longitudinal direction of the vehicle, thereby enabling the automatic fastening of the webbings about the occupant.

Consequently, this anchor plate 18, when moving in a direction of fastening the webbings about the occupant, moves along the roof side member 44 rearwardly in the vehicle, then moves downwardly along the center pillar 40, and accordingly, the loop portion 80 of the connecting wire 74 and the pin 100 are perpendicular in their axes. As a result, in this embodiment, during the movement of the webbings, the direction of relative movement between the anchor plate 18 and the loop portion 80 is perpendicular to that in the case of the preceding embodiment. However, this embodiment is similar in other respects of construction to the preceding embodiment, and, in the event of an emergency situation of the vehicle, the emergency tensioning device 46 operates, whereby the loop portion 80 moves the anchor plate 18 rearwardly in the vehicle, so that a tension of an appropriate value can be generated in the webbing 12.

In addition, to the respective embodiments described above, description has been given to the emergency tensioning device 46 adapted to generate the tension to the shoulder webbing, however, the concept of the invention is not limited to this type, but on the contrary, it should be naturally possible to generate the tension in other webbings such as the lap webbing.

Figure 10:
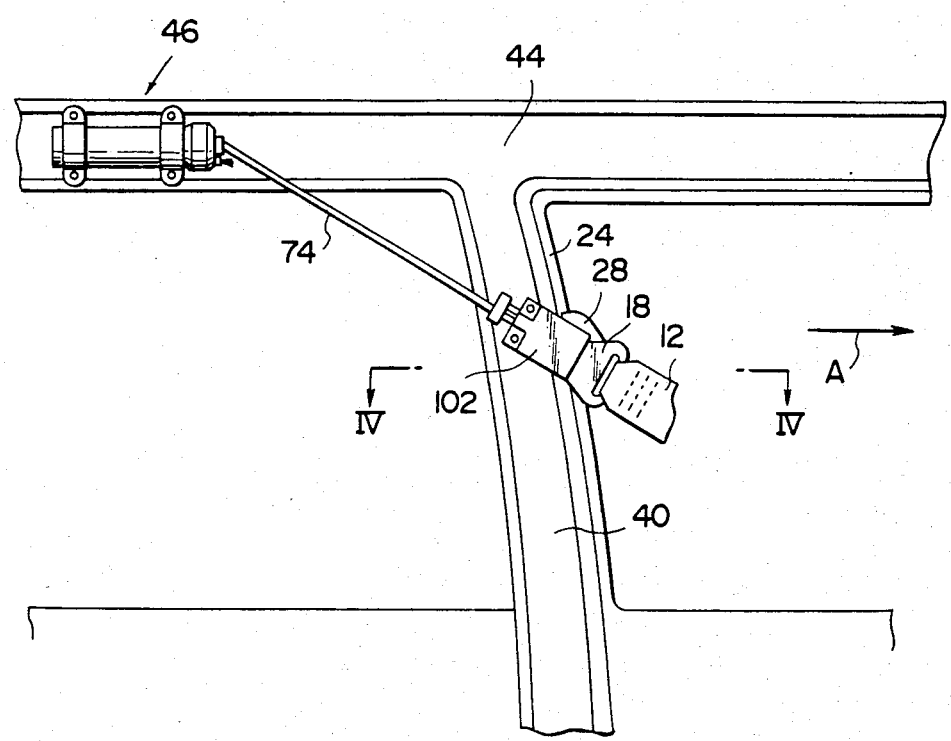
FIG. 10 is a side view from the inside of the compartment showing the side portion of the driver's seat in a third embodiment of the present invention.
Figure 11:
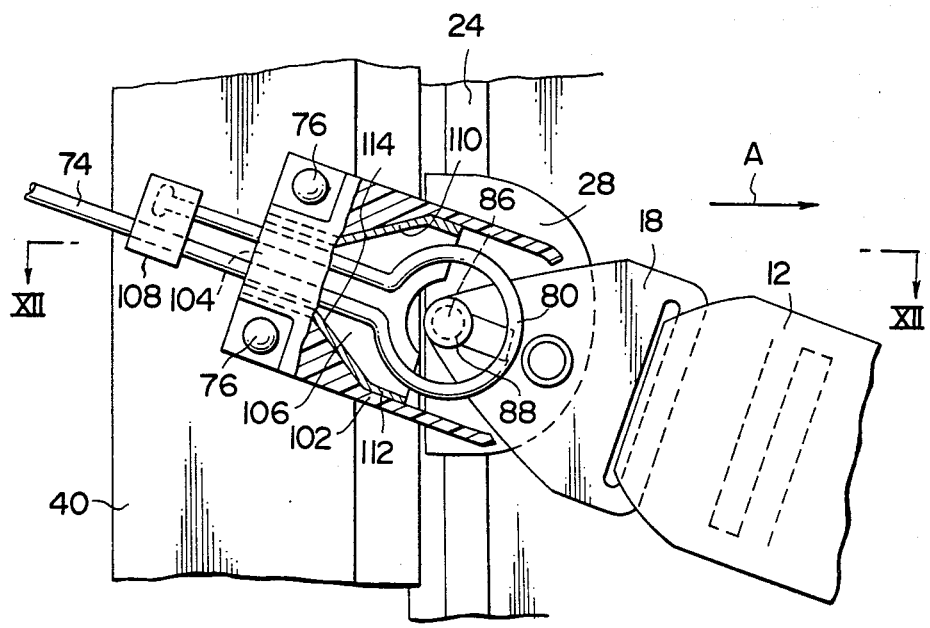
FIG. 11 is a partially enlarged view of FIG. 10.
Figure 12:
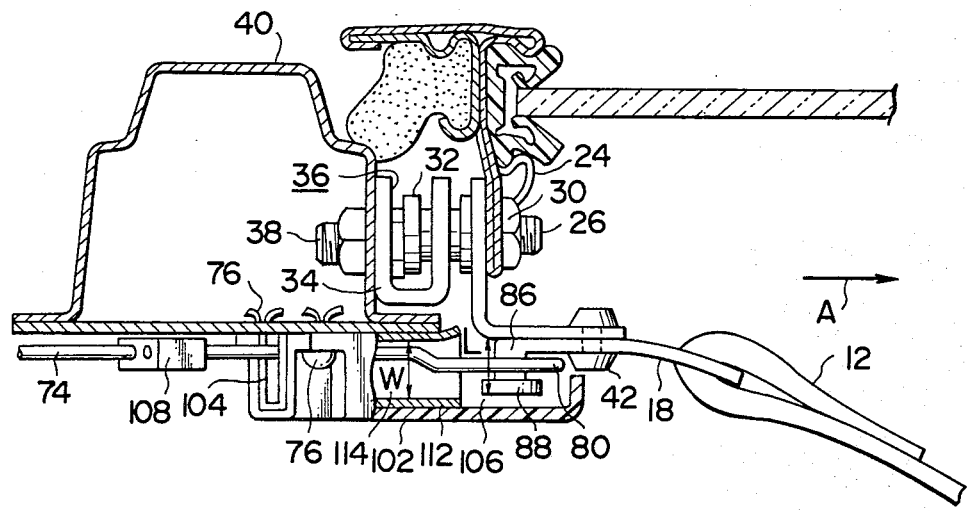
FIG. 12 is a sectional view taken along the line XII—XII in FIG. 11.

Description will hereunder be given of a third embodiment of the present invention with reference to FIGS. 10, 11 and 12.

As shown in FIGS. 11 and 12 in detail, in this embodiment, the bracket 78 used in the first embodiment is replaced by a guide 102, which is secured to the center pillar 40 by means of shear pins 76.

The intermediate portion of the connecting wire 74 extends downwardly and forwardly in the vehicle, passes through an opening 104 of the guide 102 and is led into a recess 106. In this recess 106, the connecting wire 74 turns about, forming the loop portion 80, further, the forward end portion of the connecting wire 74 passes through the opening 104, projects from the guide 102 and is solidly secured to the intermediate portion of the connecting wire 74 by means of a block 108.

As shown in FIG. 11, the loop portion 80 in the guide 102 has a horizontal axis directed laterally of the vehicle, and, when the door 16 is closed, the horizontal pin 86 projecting inwardly into the vehicle, of the anchor plate 18, is adapted to be inserted through the loop portion 80. The forward end portion of this horizontal pin 86 is formed into an enlarged head portion 88, so that the horizontal pin 86 can be reliably engaged with the loop portion 80 in the event of an emergency situation of the vehicle.

The recess 106 of the guide 102 is provided with a tapered portion 110 whose inner diameter is progressively decreased towards the emergency tensioning device 46. The inner surfaces of the tapered portion 110 and the opening 104 are solidly secured thereto with reinforcing sheets 112 formed of thin steel sheets having a tapered portion 114 identical with the tapered portion 110. This tapered portion 114 is opposed to the loop portion 80, and, when engaged with the loop portion 80, deforms and reduces the loop portion 80 in size so that the loop portion 80 can be engaged with the horizontal pin 86. An interval W between the reinforcing sheets 112 in the horizontal direction (Refer to FIG. 12) is larger than a dimension L in the horizontal direction of the horizontal pin 86 of the anchor plate 18, whereby, when the loop portion 80 engages the horizontal pin 86 and pulls it rearwardly in the vehicle upon operation of the emergency tensioning device 46, the horizontal pin 86 enters a space of the interval W formed between the reinforcing sheets 112, so that the horizontal pin 86 is prevented from moving laterally of the vehicle, thus protecting the horizontal pin 86 from falling off the loop portion 80.

If the vehicle falls into the event of an emergency situation such as a collision, then the powder 54 in the emergency tensioning device 46 is exploded through the action of the acceleration sensor, not shown, to thereby move the piston 56 rearwardly in the vehicle. As a consequence, the sliding rod 58 drives the connecting wire 74 rearwardly in the vehicle, whereby the loop portion 80 engages the horizontal pin 86.

In this case, during movement, the loop portion 80 engages the tapered portion 110 through the reinforcing sheets 112, whereby the loop portion 80 is reduced in inner diameter to thereby reliably engage the horizontal pin 86, so that the driving force of the emergency tensioning device 46 can be transmitted to the anchor plate 18 through the horizontal pin 86.

As a result, the guide 102 shears the shear pins 76 and the anchor plate 18 shears the shear pin 42, whereby the outer end portion of the shoulder webbing 12 moves rearwardly in the vehicle, so that a slack between the webbings and the occupant can be eliminated, thereby enabling the webbings to be tightly fastened about the occupant.

Figure 13:
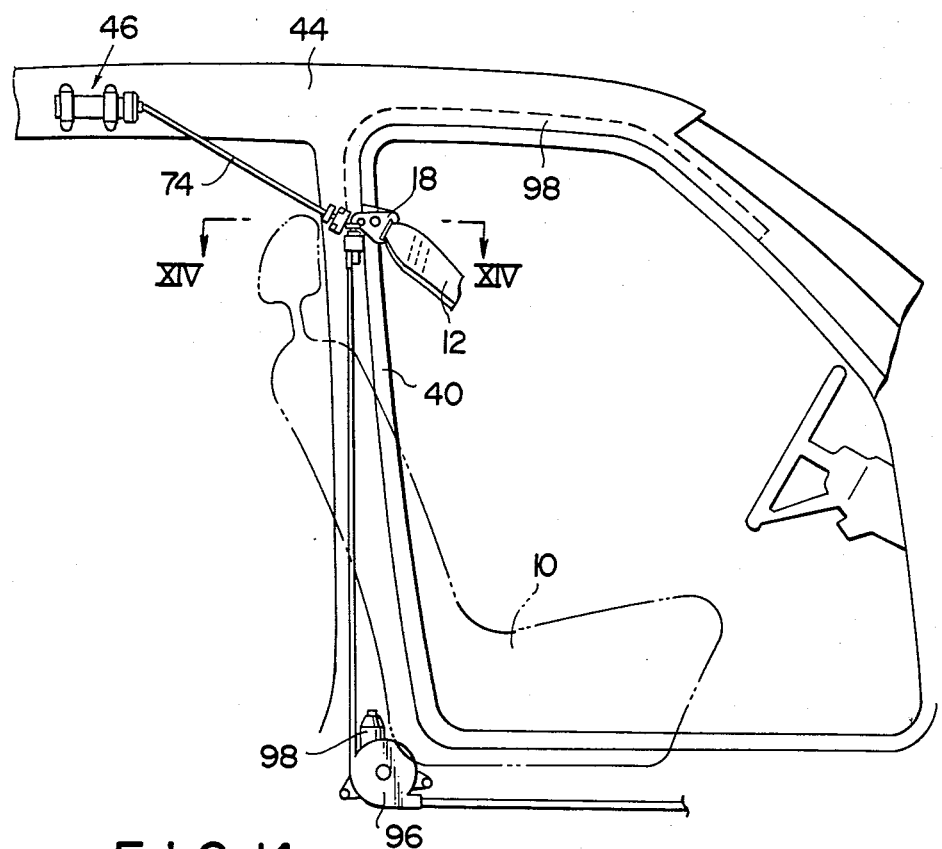
FIG. 13 is a side view showing a fourth embodiment of the present invention, corresponding to FIG. 2.
Figure 14:
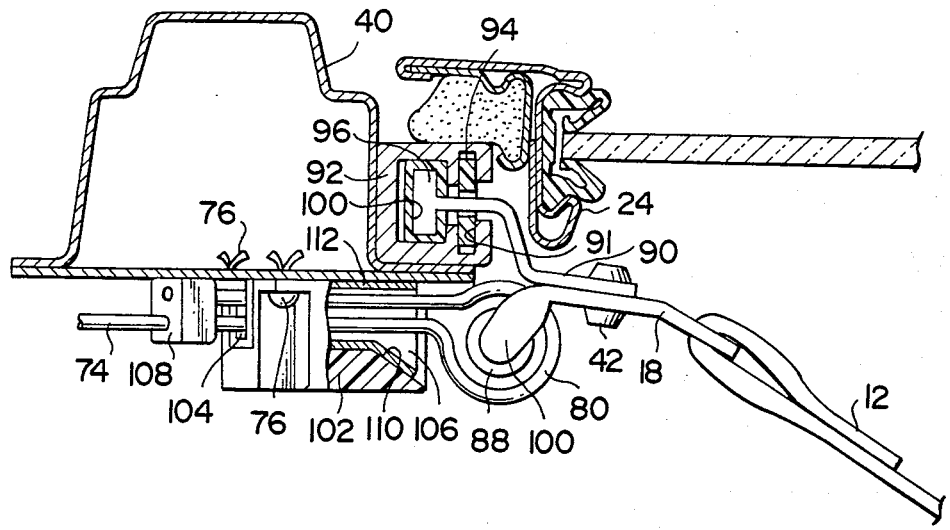
FIG. 14 is a sectional view taken along the line XIV—XIV in FIG. 13.

Description will hereunder be given of a fourth embodiment of the present invention with reference to FIGS. 13 and 14.

In this embodiment, the bracket 78 in the second embodiment is replaced by a guide 102 similar to that in the third embodiment and in the event of an emergency situation of the vehicle, the loop portion 80 of the connecting wire 74 is reliably connected to the horizontal pin 86.

Figure 15:
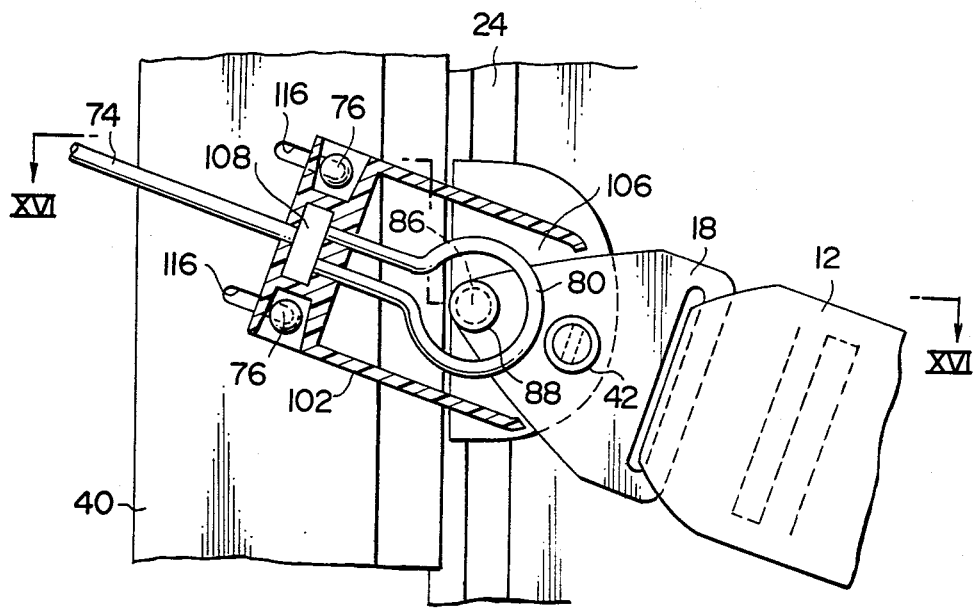
FIG. 15 is a sectional view showing a fifth embodiment of the present invention, corresponding to FIG. 3.
Figure 16:
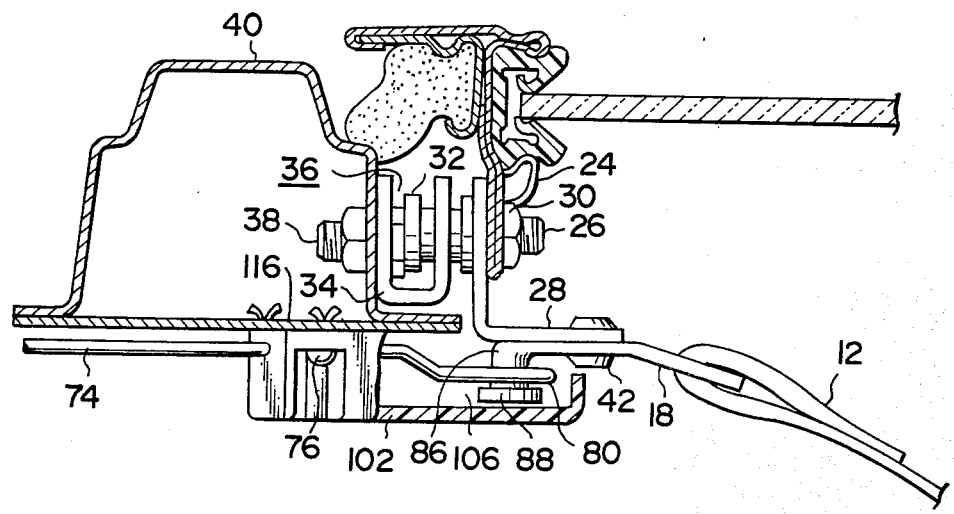
FIG. 16 is a sectional view taken along the line XVI—XVI in FIG. 15.

FIGS. 15 and 16 show a fifth embodiment of the present invention, in which the block 108 fastening the end portion of the connecting wire 74 is solidly secured to the guide 102 and movable together with the guide 102. Additionally, the shear pins 76 of the guide 102 penetrate through slots 116 formed in the center pillar 40. These slots 116 are formed in the longitudinal direction of the connecting wire 74, and the shear pins 76 are adapted to move together with the guide 102 by a stroke of these slots 116, and thereafter, are shorn.

Consequently, in this embodiment, during operation of the emergency tensioning device 46, the loop portion 80 moves together with the guide 102, and, after the loop portion 80 is positively connected to the horizontal pin 86, the shear pins 76 are shorn, so that the loop portion 80 cannot be disengaged from the horizontal pin 86 during shearing of the shear pins 76.

Figure 17:
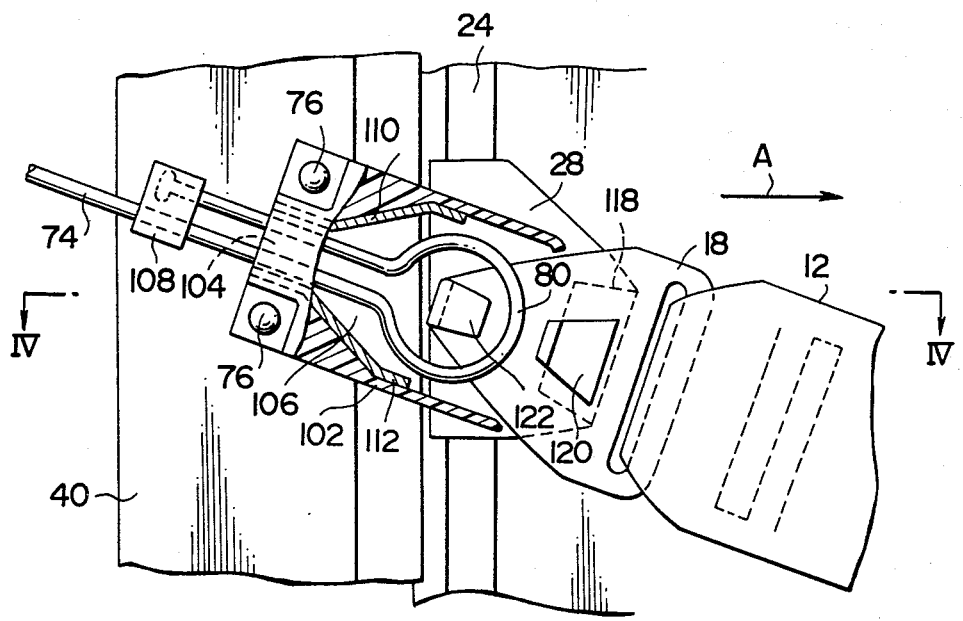
FIG. 17 is a sectional view showing a sixth embodiment of the present invention, corresponding to FIG. 3.
Figure 18:
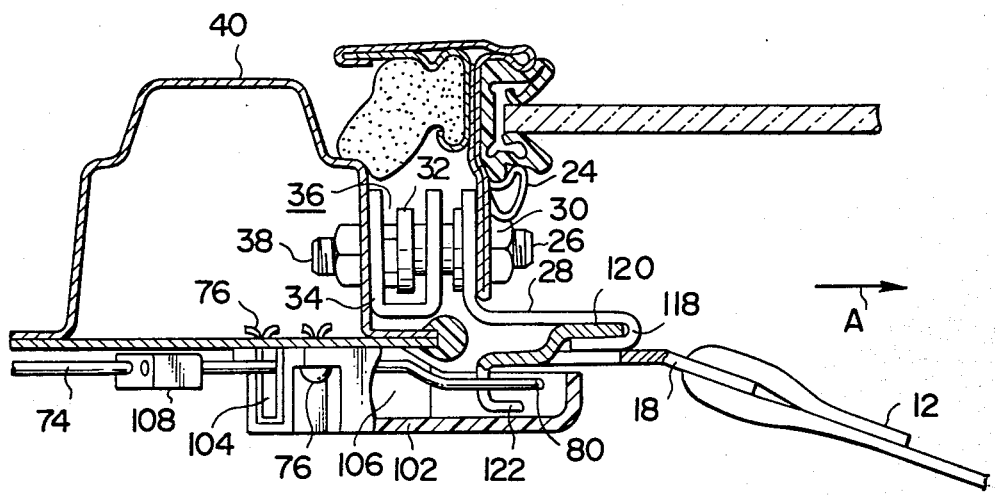
FIG. 18 is a sectional view taken along the line XVIII—XVIII in FIG. 17.

Description will now be given of the sixth embodiment of the present invention with reference to FIGS. 17 and 18.

In this embodiment, the form of the anchor plate 18 in the third embodiment is varied, and the connecting mode between the anchor plate 18 and the L-shaped anchor plate 28 is changed, i.e., one side of the L-shaped anchor plate 28 is extended in the longitudinal direction of the vehicle and the forward end portion of one side of the L-shaped anchor plate 28 is turned into a bent portion 118 as being means for engaging the anchor plate 18. Inserted into a space formed between the bent portion 118 and the L-shaped anchor plate 28 is a shaved-up portion 120 formed on the anchor plate 18, the L-shaped anchor plate 28 and the bent portion 118 clamp the shaved-up portion 120 under pressure of a predetermined value, and this shaved-up portion 120 and the anchor plate 18 clamp the bent portion 118 under pressure of a predetermined value. Consequently, during normal running condition of the vehicle, the anchor plate 18 cannot move relative to the L-shaped anchor plate 28, and, when the anchor plate 18 is subjected to tension by the shoulder webbing 12 in the event an emergency situation of the vehicle and a load of moving the anchor plate 18 forwardly in the vehicle is generated in the anchor plate 18, this load is imparted to the L-shaped anchor plate 28 through the bent portion 118. However, when an external force acts on the anchor plate 18 rearwardly in the vehicle, the shaved-up portion 120 is withdrawn from a space formed between the bent portion 118 and the L-shaped anchor plate 28 so as to move rearwardly in the vehicle.

In the anchor plate 18, the pin 86 in the third embodiment is replaced by a hook 122 bent forwardly in the vehicle, and the anchor plate 18 is engaged with the connecting wire 74 at this hook 122.

When the vehicle falls into a collision of a relatively low speed, the acceleration sensor for actuating the emergency tensioning device 46 is not actuated, however, an inertial force moves the occupant in the direction of the collision. As a consequence, due to this inertial force, a high tension is generated in the shoulder webbing 12, and this tension of the webbing is imparted to the L-shaped anchor plate 28 via the shaved-up portion 120 and the bent portion 118. Because of this, the window frame 24, to which the L-shaped anchor plate 28 is secured, is deformed forwardly in the vehicle. However, upon slight deformation of the window frame 24, the enlarged head portion 32 of the bolt 26 solidly secured to the window frame 24 engages the holder 34, whereby the tension of the webbing is positively supported by the center pillar 40 via the holder 34, so that the occupant can be reliably restrained, thereby enabling the occupant to be safely secured.

When the vehicle falls into a collision at a relatively high speed, the emergency tensioning device 46 drives the connecting wire 74 rearwardly in the vehicle, whereby the loop portion 80 is engaged with the hook 122.

In this case, during its movement, the loop portion 80 is engaged with the tapered portion 110 via the reinforcing sheets 112, whereby the loop portion is reduced in inner diameter to be reliably engaged with the hook 122, thereby enabling the driving force of the emergency tensioning device 46 to be transmitted to the anchor plate 18 via the hook 122.

As a result, the shaved-up portion 120 of the anchor plate 18 is withdrawn from the space formed between the main body of the L-shaped anchor plate 28 and the bent portion 118 so as to move rearwardly in the vehicle, whereby the guide 102 shears the shear pins 76. As a consequence, the outer end portion of the shoulder webbing 12 moves rearwardly in the vehicle, whereby the slack between the webbings and the occupant is eliminated, so that the webbings can be tightly fastened about the occupant.

Figure 21:
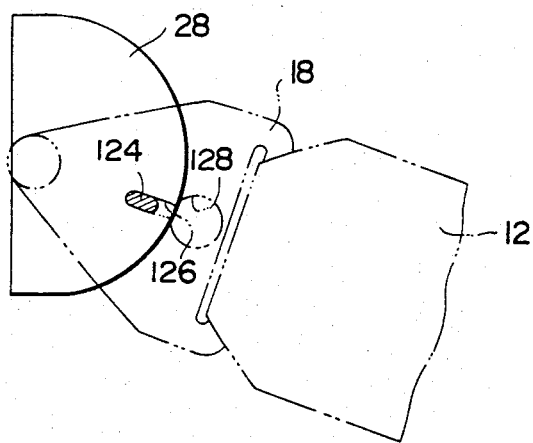
FIG. 21 is a sectional view taken along the line XXI—XXI in FIG. 20.
Figure 19:
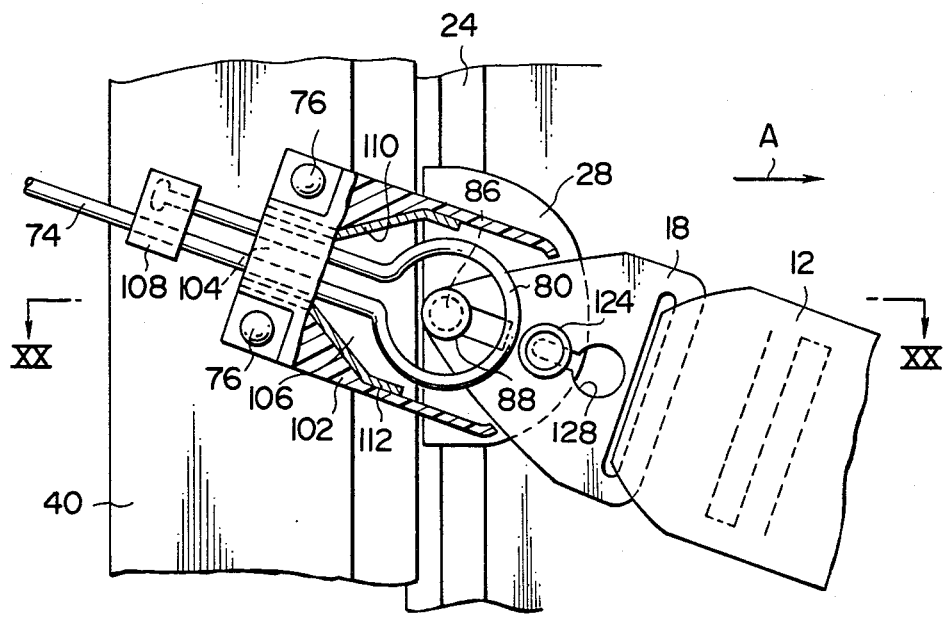
FIG. 19 is a sectional view showing a seventh embodiment of the present invention, corresponding to FIG. 3.
Figure 20:
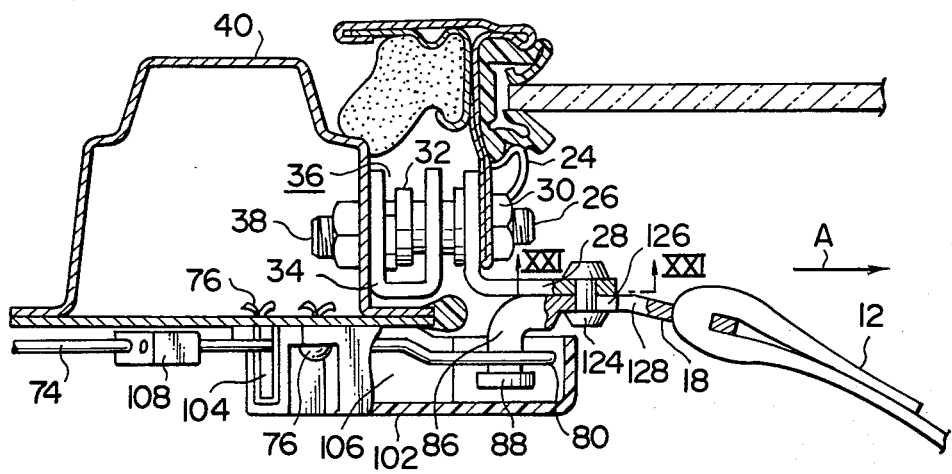
FIG. 20 is a sectional view taken along the line XX—XX in FIG. 19.

FIGS. 19 and 20 show a seventh embodiment of the present invention, in which the anchor plate 18 is engaged with the L-shaped anchor plate 28 via an anchor pin 124. As shown in FIG. 21, this anchor pin 124 is elliptic in cross section, passes through the L-shaped anchor plate 28, and is inserted through an elliptic hole 126 penetratingly provided at a position corresponding to the position of the anchor plate 28, through which the anchor pin 124 is inserted. Consequently, the anchor plate 18 is not rotatable relative to the anchor pin 124 and the L-shaped anchor plate 28. However, when the anchor plate 18 is moved relative to the stem portion of the anchor pin 124 and a round hole 128 communicated with the end portion of the slot 126 is registered with the stem portion of the anchor pin 124, the anchor plate 18 becomes rotatable relative to the L-shaped anchor plate 28. Additionally, this round hole 128 is larger in diameter than the head portion of the anchor pin 124, whereby the anchor pin 124 can pass through this round hole 128, so that the anchor plate 18 can move relative to the L-shaped anchor plate 28 and fall off the L-shaped anchor plate 28.

In addition, in this embodiment, the hook 122 in the preceding embodiment is replaced by a horizontal pin.

Also in the seventh embodiment of the present invention constructed as above, during normal running condition of the vehicle, the anchor plate 18 engages the anchor pin 124 to be prevented from moving forwardly in the vehicle and the anchor plate 18 is not rotatable, so that the webbing 12 can be automatically fastened about or unfastened from the occupant in accordance with the opening and closing motions of the door 16.

Additionally, in the event of a collision at a high speed of the vehicle, a tension acting on the shoulder webbing 12 is imparted to the holder 34 via the anchor plate 18, the anchor pin 124, the L-shaped anchor plate 28 and the bolt 26, whereby the tension of the webbing is reliably imparted to the center pillar 40, thereby maintaining the occupant in a restrained state.

In the event of a collision at a high speed of the vehicle, the connecting wire 74 driven by the emergency tensioning device 46 engages the pin 86 to move the anchor plate 18 rearwardly in the vehicle. At this time, the anchor plate 18 moves to a position where its round hole 128 can be registered with the anchor pin 124, the anchor pin 124 passes through the round hole 128, whereby the anchor plate 18 falls off the L-shaped anchor plate 28 to be driven rearwardly in the vehicle, so that the webbing 12 can be tightly fastened about the occupant, thereby enabling the occupant to be secured in a tightly restrained state.

Figure 22:
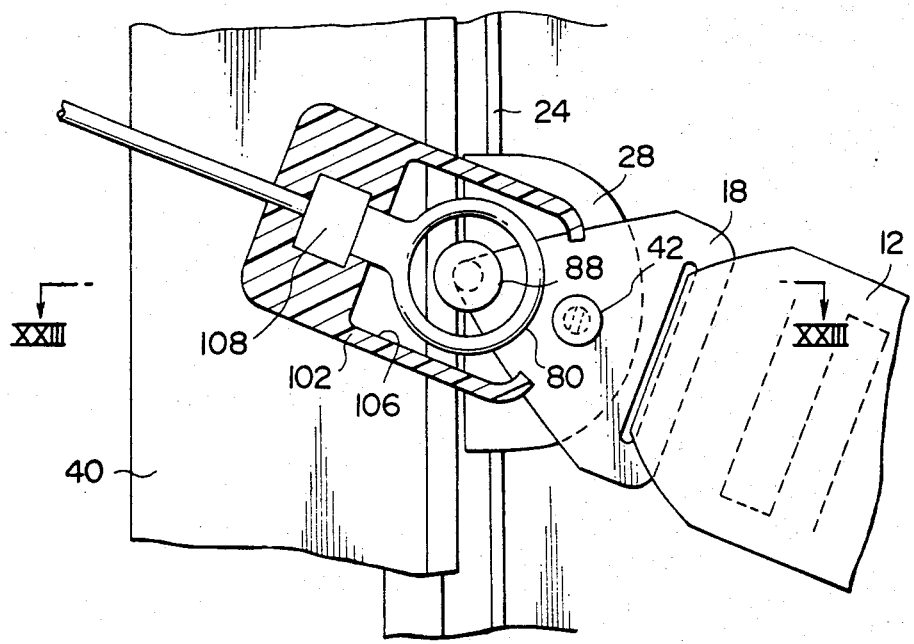
FIG. 22 is a sectional view showing an eighth embodiment of the present invention, corresponding to FIG. 3.
Figure 23:
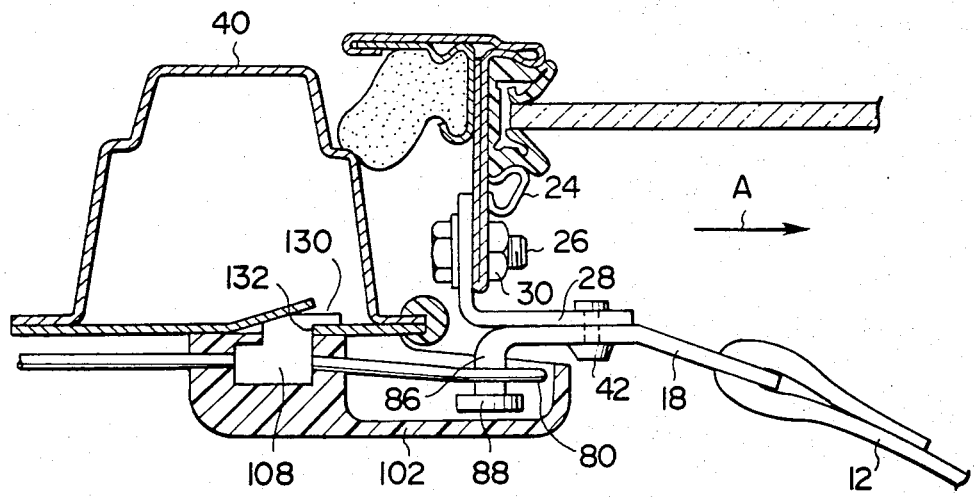
FIG. 23 is a sectional view taken along the line XXIII—XXIII in FIG. 10.

Next, in FIGS. 22 and 23 show an eighth embodiment of the present invention.

Unlike in the preceding embodiment, in this embodiment, the anchor plate 18 is engaged with the L-shaped anchor plate 28 through the shear pin 42. During normal running condition of the vehicle, this shear pin 42 engages the anchor plate 18 to prevent the anchor plate from being movable and rotatable relative to the L-shaped anchor plate 28. However, as a high inertial force is generated in the longitudinal direction of the vehicle between the anchor plate 18 and the L-shaped anchor plate 28, the shear pin 42 is shorn to cause the anchor plate 18 to fall off the L-shaped anchor plate 28.

Additionally, unlike the preceding embodiments, in this embodiment, the means for supporting the anchor plate 18 on the center pillar 40 is not provided on the L-shaped anchor plate 28, and instead, a hook 130 projects forwardly in the vehicle from a block 108 solidly secured to the intermediate portion of the connecting wire 74. This hook 130 is inserted into a shaved-up hole 132 formed on the center pillar 40.

Consequently, in this embodiment, in the event of a collision at a low speed of the vehicle, the tension of the webbing shears the shear pin 42, whereby the anchor plate 18 moves forwardly in the vehicle to engage the loop portion 80, so that the tension of the webbing can be supported by the center pillar 40 through the block 108.

In the event of a collision at a high speed of the vehicle, the hook 130 is withdrawn from the shaved-up hole 132 and moves rearwardly in the vehicle due to the driving force of the connecting wire 74, whereby the loop portion 80 engages the pin 86 to cause the anchor plate 18 to move rearwardly in the vehicle, so that a tightening tension can be generated in the webbing 12.

What is claimed is:

1. A seatbelt system having a webbing to be fastened about an occupant seated at a seat in an automotive vehicle, comprising:

a retractor securing one end of the webbing for winding or unwinding the webbing during normal condition of a vehicle and preventing the webbing from being unwound in the event of an emergency situation of the vehicle;

an anchor plate secured to the other end of the webbing;

driving means connected to said anchor plate for moving said anchor plate so that, when the occupant is seated at the seat for driving the vehicle, the webbing is fastened about the occupant seated at the seat and, when the occupant leaves the vehicle, the webbing is released from the occupant;

emergency tensioning means for pulling said anchor plate in the event of an emergency situation of the vehicle in such a direction that the webbing is fastened more tightly about the occupant seated at the seat, said emergency tensioning means for engagement with said anchor plate only when the webbing is fastened about the occupant seated at the seat, said emergency tensioning means further comprising: a cylinder firmly secured into the inner surface of the vehicle body, a piston slidably inserted into said cylinder, and connecting means for connecting said piston to said anchor plate only when the webbing is fastened about the occupant seated at the seat;

said connecting means further comprising: a sliding member slidably inserted into said cylinder at an end opposite the end which is the open end of said hollow member faces, and an engaging member firmly secured to said sliding member for engagement with said anchor plate, said engaging member further comprising a wire having a loop portion for engagement with said anchor plate, and, a stopper extending through said piston and having opposite ends, one end thereof being firmly secured to said sliding member, and the other end thereof radially extending, not passing through said piston, in the direction toward the former end, and said latter end being deformable by a tension of the webbing beyond a predetermined value;

exploding means for exploding in the event of an emergency situation of the vehicle to push said piston in such a direction that said connecting means pulls said anchor plate so that the webbing can be refastened more tightly about the occupant seated at the seat; and ignition means for igniting said exploding means in the event of an emergency of the vehicle.

2. A seatbelt system as claimed in claim 1, wherein said piston comprises:

a piston body slidable within said cylinder and having an open end and a radial through hole, said open end being open in a direction in which said piston is pushed by said exploding means;

a hollow member inserted into said piston body from said open end and connected to said connecting means, said hollow member including an inclined plane facing the inner surface of said piston body within said piston body, said inclined plane being inclined upwardly in the direction toward said open end;

a locking pin inserted through said radial through hole, one end of said locking pin facing the inner surface of said cylinder, the other end of said locking pin facing said inclined plane; and overfastening preventing means for preventing said piston body and said hollow member from relatively moving to each other until said piston body is pulled by the webbing beyond a predetermined value of tension.

3. A seatbelt system as claimed in claim 2, wherein said overfastening preventing means comprises a shear pin.

4. A seatbelt system as claimed in claim 1, wherein said wire is detachably attached to the vehicle body.

5. A seatbelt system as claimed in claim 1, wherein said anchor plate includes a projecting member to engage said loop portion, and said loop portion is guided by a guide in a direction of said emergency tensioning means along the movement of said wire, said guide including facing inner surfaces tapered toward said emergency tensioning means to deform said loop portion so that said loop portion can grip said projecting member when said emergency tensioning means pulls said engaging member.

6. A seatbelt system as claimed in claim 5, wherein said guide is secured to the vehicle body through shear pins.

7. A seatbelt system as claimed in claim 1, wherein said anchor plate includes a finger plate extending in a direction opposite to the direction in which said emergency tensioning means pulls said connecting member, and said door includes a member for frictionally holding said finger plate until said emergency tensioning means pulls said connecting member.

8. A seatbelt system as claimed in claim 1, wherein said anchor plate includes a slot extending in a direction along the movement of said connecting member, said anchor plate is attached to the door through an anchor pin having an enlarged head, and said anchor plate further includes a hole permitting said enlarged head to pass therethrough at one end of said slot to a direction in which said emergency tensioning means pulls said connecting member.

9. A seatbelt system as claimed in claim 1, wherein said connecting member is provided with a block, said block is held by a member in such a manner that said block is broken to be displaced toward said emergency tensioning means when said emergency tensioning means pulls said connecting member, and said block includes a finger plate to engage the vehicle body to prevent said block from moving in the direction opposite to a direction in which said emergency tensioning means pulls said connecting member.

10. A seatbelt system as claimed in claim 1, wherein said anchor plate includes a pin projecting in a direction along the movement of the anchor plate to a position where the webbing is fastened about the occupant seated at the seat.

11. A seatbelt system having a webbing to be fastened about an occupant seated at a seat in an automotive vehicle, comprising:

a retractor securing one end of the webbing for winding or unwinding the webbing during normal condition of a vehicle and preventing the webbing from being unwound in the event of an emergency situation of the vehicle;

an anchor plate secured to the other end of the webbing and secured to a movable anchor plate through a shear pin, said movable anchor plate being slidably engaged with a guide rail;

driving means connected to said anchor plate for moving said anchor plate so that, when the occupant is seated at the seat for driving the vehicle, the webbing is fastened about the occupant seated at the seat and, when the occupant leaves the vehicle, the webbing is released from the occupant;

said driving means further comprising: a guide rail for guiding said anchor plate between a position where the webbing is fastened about the occupant seated at the seat and a position where the webbing is released from the occupant, a motor for driving said anchor plate to move said anchor plate from one position to the other and transmitting means extending along said guide rail for transmitting the power of said motor to said anchor plate thereby moving said anchor plate; and emergency tensioning means for pulling said anchor plate in the event of an emergency situation of the vehicle in such a direction that the webbing is fastened more tightly about the occupant seated at the seat, said emergency tensioning means for engagement with said anchor plate only when the webbing is fastened about the occupant seated at the seat.

12. A seatbelt system as claimed in claim 11, wherein said anchor plate includes a pin projecting in a direction along the movement of the anchor plate to a position where the webbing is fastened about the occupant seated at the seat.

13. A seatbelt system as claimed in claim 11, wherein said shear pin has a noncircular cross section to prevent said anchor plate from rotating.

14. A seatbelt system having a webbing to be fastened about an occupant seated at a seat in an automotive vehicle, comprising:

a retractor securing one end of the webbing for winding or unwinding the webbing during normal condition of a vehicle and preventing the webbing from being unwound in the event of an emergency situation with the vehicle;

an anchor plate secured to the other end of the webbing;

said anchor plate detachably secured to a door of said automotive vehicle through a shear pin, said anchor plate being detachable from said door when tension is imposed on said anchor plate by said webbing beyond a predetermined value;

driving means connected to said anchor plate for moving said anchor plate so that, when the occupant is seated at the seat for driving the vehicle, the webbing is fastened about the occupant seated at the seat and, when the occupant leaves the vehicle the webbing is released from the occupant;

said driving means further comprising a door, and said anchor plate is attached to said door at such a portion of the inner surface of the door that said anchor plate is swung by the door with a relatively large radius when the door is opened or closed; and emergency tensioning means for pulling said anchor plate in the event of an emergency situation of the vehicle in such a direction that the webbing is fastened more tightly about the occupant seated at the seat, said emergency tensioning means for engagement with said anchor plate only when the webbing is fastened about the occupant seated at the seat.

15. A seatbelt system as claimed in claim 14, wherein said anchor plate includes a pin projecting in a direction along the movement of the anchor plate to a position where the webbing is fastened about the occupant seated at the seat.

16. A seatbelt system as claimed in claim 14, wherein said door includes an anchor bolt engageable with the vehicle body when said door is closed, said anchor plate being connected to said anchor plate through said shear pin.

17. A seatbelt system as claimed in claim 16, wherein said door is provided with a holder having a recess being open outwardly of the vehicle to receive said anchor bolt when said door is closed so that said holder engages said anchor bolt to prevent it from excessive rearward movement in the vehicle.

* * * * *